United States Patent
Chau et al.

(10) Patent No.: US 9,798,523 B2
(45) Date of Patent: Oct. 24, 2017

(54) METHOD FOR GENERATING WORKFLOW MODEL AND METHOD AND APPARATUS FOR EXECUTING WORKFLOW MODEL

(71) Applicant: Electronics and Telecommunications Research Institute, Daejeon (KR)

(72) Inventors: Nguyen Minh Chau, Daejeon (KR); Hee-Sun Won, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/954,080

(22) Filed: Nov. 30, 2015

(65) Prior Publication Data
US 2016/0364211 A1    Dec. 15, 2016

(30) Foreign Application Priority Data
Jun. 11, 2015  (KR) .......................... 10-2015-0082719

(51) Int. Cl.
G06F 9/44 (2006.01)
G06Q 10/06 (2012.01)

(52) U.S. Cl.
CPC ................. G06F 8/20 (2013.01); G06F 8/35 (2013.01); *G06Q 10/06* (2013.01)

(58) Field of Classification Search
CPC .............. G06F 8/20; G06F 8/35; G06Q 10/06
See application file for complete search history.

(56) References Cited

U.S. PATENT DOCUMENTS 6,038,393 A * 3/2000 Iyengar .................... G06F 8/20
                                                    717/104
6,167,564 A * 12/2000 Fontana .................... G06F 8/20
                                                    717/104

(Continued)

FOREIGN PATENT DOCUMENTS

| CN | 103761111 A | 4/2014 |
| KR | 10-2011-0066520 A | 6/2011 |
| KR | 10-2012-0067889 A | 6/2012 |

OTHER PUBLICATIONS

Aymeric Dussart et al., "An Evaluation of Inter-Organizational Workflow Modeling Formalisms", [Online], 2004, pp. 74-104, [Retrieved from internet on Jun. 12, 2017], <https://pdfs.semanticscholar.org/b013/25e04220fdf4e501ce443fb7b38c6ba2efb4.pdf>.*

(Continued)

*Primary Examiner* — Ziaul A Chowdhury
(74) *Attorney, Agent, or Firm* — Nelson Mullins Riley & Scarborough LLP (57) ABSTRACT

Disclosed are a method of modeling a workflow used in the field of big data and a method and apparatus for executing a workflow model. The method of executing the workflow model according to an embodiment of the present invention comprises receiving a Unified Modeling Language (UML)-based workflow model needing at least one data storage engine and at least one data processing engine, parsing the received workflow model to generate structured information, verifying the validity of the workflow model using the structured information, and transmitting jobs included in the workflow model to data processing engines corresponding to the jobs when it is determined that the workflow model is valid. Thus, developers can be allowed to easily acquire a workflow runnable on various data storage engines and various data processing engines.

12 Claims, 9 Drawing Sheets

(56) References Cited

U.S. PATENT DOCUMENTS

| | | | | |
|---|---|---|---|---|
| 6,442,748 | B1* | 8/2002 | Bowman-Amuah | G06F 8/20 707/999.009 |
| 7,272,816 | B2* | 9/2007 | Schulz | G06Q 10/06 717/104 |
| 8,949,772 | B1* | 2/2015 | Talby | G06F 8/35 714/38.14 |
| 2002/0046394 | A1* | 4/2002 | Do | G06F 8/20 717/108 |
| 2004/0133445 | A1* | 7/2004 | Rajan | G06Q 10/067 717/108 |
| 2004/0153397 | A1* | 8/2004 | Cavey | G06Q 10/063 705/39 |
| 2004/0216087 | A1* | 10/2004 | Wilson | G06F 8/24 717/116 |
| 2006/0064666 | A1* | 3/2006 | Amaru | G06F 17/30557 717/100 |
| 2007/0276689 | A1* | 11/2007 | Slone | G06F 8/34 717/109 |
| 2008/0216058 | A1* | 9/2008 | Solimano | G06F 11/3664 717/128 |
| 2009/0287675 | A1* | 11/2009 | Dorrell | G06Q 10/06 |
| 2009/0300477 | A1* | 12/2009 | Soulier | G06F 17/2247 715/234 |
| 2010/0023921 | A1* | 1/2010 | Chaar | G06Q 10/06 717/102 |
| 2010/0175054 | A1* | 7/2010 | Matusikova | G06F 17/227 717/136 |
| 2011/0004612 | A1* | 1/2011 | Boyersmith | G06F 8/35 707/769 |
| 2011/0145326 | A1 | 6/2011 | Lee et al. | |
| 2012/0158453 | A1 | 6/2012 | Chung et al. | |
| 2013/0166591 | A1* | 6/2013 | Nandyal | G06F 17/30277 707/769 |
| 2013/0304431 | A1* | 11/2013 | Kannegala | G06Q 10/00 703/2 |
| 2014/0129607 | A1* | 5/2014 | Nagumo | H04L 41/5048 709/201 |
| 2016/0011905 | A1* | 1/2016 | Mishra | G06Q 10/06 718/102 |
| 2016/0239272 | A1* | 8/2016 | Petri | G06F 8/35 |

OTHER PUBLICATIONS

Christian Hahn et al., "Agent-based Extensions for the UML Profile and Metamodel for Service-oriented Architectures", [Online], IEEE Sep. 2008, pp. 1-8, [Retrieved from Internet on Jun. 12, 2016], <http://ieeexplore.ieee.org/stamp/stamp.jsp?tp=&arnumber=4815032>.*

Junichi Suzuki et al., "Toward the Interoperable Software Design Models: Quartet of UML, XML, DOM and CORBA", [Online], IEEE 1999, pp. 1-10, [Retrieved from Internet on Jun. 12, 2016], <http://ieeexplore.ieee.org/stamp/stamp.jsp?tp=&arnumber=766591>.*

Bugra Mehmet Yildiz et al., "Meta-Model for Global Software Development to Support Portability and Interoperability in Global Software Development", [Online], 2011, pp. 98-103, [Retrieved from Internet on Jun. 12, 2016], <http://doc.utwente.nl/87804/1/icsea_2011_4_40_10316.pdf>.*

About Luigi, 2015, 5 pages.
Oozie, Workflow Engine for Apache Hadoop, 2015, 3 pages.
Overview of Azkaban, 2015, 44 pages.
Unified Modeling Language, "OMG Unified Modeling Language TM (OMG UML), Superstructure," Version 2.4, Jan. 2011, 752 pages.

* cited by examiner

```
<group xmi:type="uml:ActivityPartition" xmi:id="id1" name="Storm" />
<group xmi:type="uml:ActivityPartition" xmi:id="id2" isDimension="true" name="HDFS" />
<node xmi:type="uml:OpaqueAction" xmi:id="id7" name="JobFile1" incoming="id8" outgoing="id9" inPartition="id1 id2">
```

FIG. 7

```
            ⋮ public class ModelJob {
            String id;
            String inputPath;
            String outputPath;
            String jobPath;
            List<ModelResource> resourceList;
            ModelProcessingSystem processingSystem;
            ModelStorageSystem storageSystemInput;
            ModelStorageSystem storageSystemOutput;
}

… # METHOD FOR GENERATING WORKFLOW MODEL AND METHOD AND APPARATUS FOR EXECUTING WORKFLOW MODEL

CROSS-REFERENCE TO RELATED APPLICATION

This application claims priority to and the benefit of Korean Patent Application No. 10-2015-0082719, filed on Jun. 11, 2015, the disclosure of which is incorporated herein by reference in its entirety.

BACKGROUND

1. Technical Field

The present invention relates to a method of generating a workflow model used in the field of big data, and a method and apparatus for executing a workflow model.

2. Discussion of Related Art

Recently, the "Big Data" era has arisen, along with simultaneous innovations from multiple sources such as theorists, system builders, scientists, and application designers. In the current trend toward model-driven development, it is natural and convenient to select a Unified Modeling Language (UML) model as a source of information in a design level. However, researches on the use of the UML in big data area, especially in a workflow modeling area that plays an important role in developing applications, is still limited If developers cannot design a workflow runnable on different data storage engines and data processing engines, the applicability of a platform system may be significantly reduced.

Conventionally, there are many workflow modeling systems such as Oozie, Azkaban, and Luigi, which have the following limitations.

First, the conventional workflow modeling systems are unfamiliar to users and thus difficult to handle. Before the systems perform tasks, many setting processes need to be performed by users. Thus, the developers should exert every effort in order to get used to such systems.

Second, there is no fixed standard to model a workflow. Each system has a unique syntax and notations. Accordingly, communication between developers who use different systems is almost impossible.

SUMMARY

Exemplary embodiments of the present invention provide a method of modeling a workflow runnable on various data storage engines and various data processing engines.

Exemplary embodiments of the present invention provide a method of modeling a workflow using the UML.

Exemplary embodiments of the present invention provide a method of verifying and executing a workflow model.

A method of executing a workflow model according to an embodiment of the present invention comprises receiving a Unified Modeling Language (UML)-based workflow model needing at least one data storage engine and at least one data processing engine; parsing the received workflow model to generate structured information; verifying validity of the workflow model using the structured information; and transmitting jobs included in the workflow model to data processing engines corresponding to the jobs when it is determined that the workflow model is valid.

The UML-based workflow model may be received in the form of an XML file.

The method may further comprise checking whether the workflow model conforms to an Object Management Group (OMG) XML Metadata Interchange (XMI) file format; and discarding the XML file when the XML file does not conform to the OMG XMI file format.

The verifying of the validity of the workflow model may comprise comparing a data processing engine name, a data storage engine name, and a resource allocation amount included in the generated structured information with predetermined information to check whether there is an error in logic of the workflow model.

The transmitting of the jobs to the data processing engines corresponding to the jobs may comprise analyzing a flow of the jobs included in the workflow model and generating a queue using executable jobs; and transmitting the jobs included in the queue to the data processing engines corresponding to the jobs.

The method may further comprise updating the queue using executable jobs among jobs remaining in the workflow model when the transmitted jobs are performed successfully.

An apparatus for executing a workflow model according to an embodiment of the present invention comprises a syntax checker configured to receive a Unified Modeling Language (UML)-based workflow model needing at least one data storage engine and at least one data processing engine and check whether the received workflow model conforms to an Object Management Group (OMG) XML Metadata Interchange (XMI) file format; a parser configured to parse the workflow model to generate structured information when the workflow model conforms to the OMG XMI file format; a logic checker configured to verify validity of the workflow model using the structured information; and a job submitter configured to transmit jobs included in the workflow model to data processing engines corresponding to the jobs when the workflow model is valid.

The UML-based workflow model may be received in the form of an XML file.

The syntax checker may discard the workflow model when the workflow model does not conform to the OMG XMI file format.

The logic checker may compare a data processing engine name, a data storage engine name, and a resource allocation amount included in the generated structured information with predetermined information to check whether there is an error in logic of the workflow model.

The apparatus may further comprise a job scheduler configured to analyze a flow of the jobs included in the workflow model and generate a queue using executable jobs, in which the job submitter transmits the jobs included in the queue to the data processing engines corresponding to the jobs.

The apparatus may further comprise a job monitor configured to monitor whether the transmitted jobs are performed successfully, in which when the transmitted jobs are performed successfully, the job scheduler updates the queue using executable jobs among jobs remaining in the workflow model.

A method of generating a workflow model according to an embodiment of the present invention comprises generating a table including two partitions when a request to perform workflow modeling using Unified Modeling Language (UML) is received; receiving a data processing engine name as a value of one of the partitions and receiving a data storage engine name as a value of the other of the partitions; receiving at least one of a starting node, an ending node, an action node, and a control flow node of the workflow; receiving resource information needed to execute jobs included in the workflow and an execution order of the jobs; and generating a workflow model conforming to an Object Management Group (OMG) XML Metadata Interchange (XMI) file format based on the input information.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

In the following description, when the detailed description of the relevant known functions or configurations is determined to unnecessarily obscure the important point of the present invention, the detailed description will be omitted.

Embodiments of the present invention provide a method of allowing a developer familiar with the UML to easily make a workflow runnable on various data storage engines and various processing engines.

In addition, embodiments of the present invention provide a method of verifying the validity of a workflow and executing the verified workflow.

Hereinafter, embodiments of the present invention will be described in detail with reference to the accompanying drawings.

Figure 1:
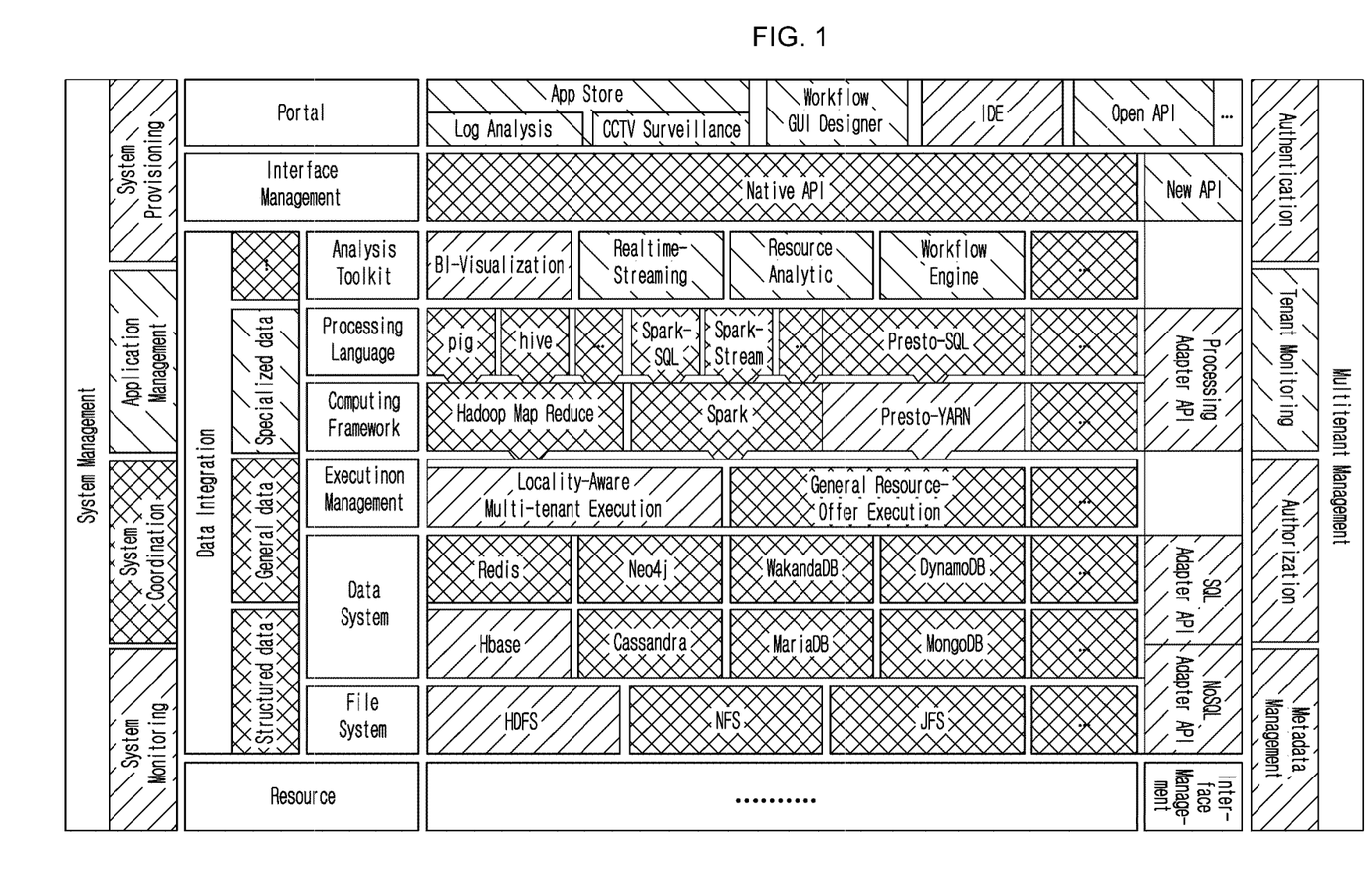
FIG. 1 is an exemplary diagram illustrating a big data platform system according to an embodiment of the present invention.

FIG. 1 is an exemplary view illustrating a big data platform system according to an embodiment of the present invention.

Various data processing engines, various data storage engines, a workflow GUI designer, and a workflow engine are exist in big data platform.

Examples of the data processing engine include Hadoop MapReduce, Spark, Presto-YARN, etc. Examples of the data storage engine include Hbase, Cassandra, MariaDB, MongoDB, etc.

Developers may model their desired workflows using a workflow GUI designer. The workflow GUI designer may transmit the workflow model to a workflow engine. The workflow GUI designer may be a conventional UML tool such as Papyrus, VisualUML, or Visual-Paradigm.

The workflow engine may verify the workflow model. The workflow engine may transmit jobs included in the workflow model to data processing engines corresponding to the jobs. A result of executing the jobs may be updated in a data storage system.

Figure 2:
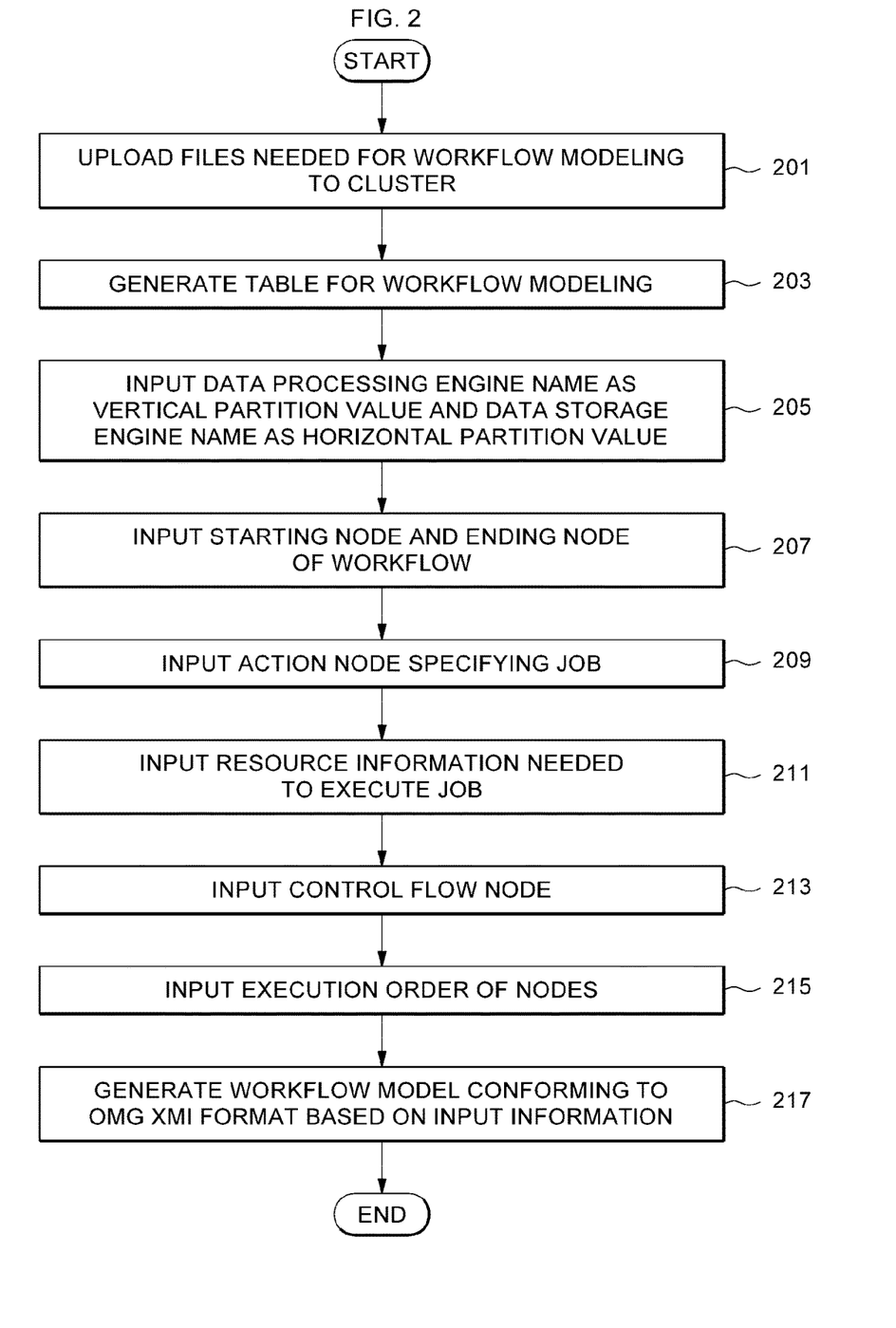
FIG. 2 is an exemplary diagram illustrating a method of generating a workflow model according to an embodiment of the present invention.
Figure 3:
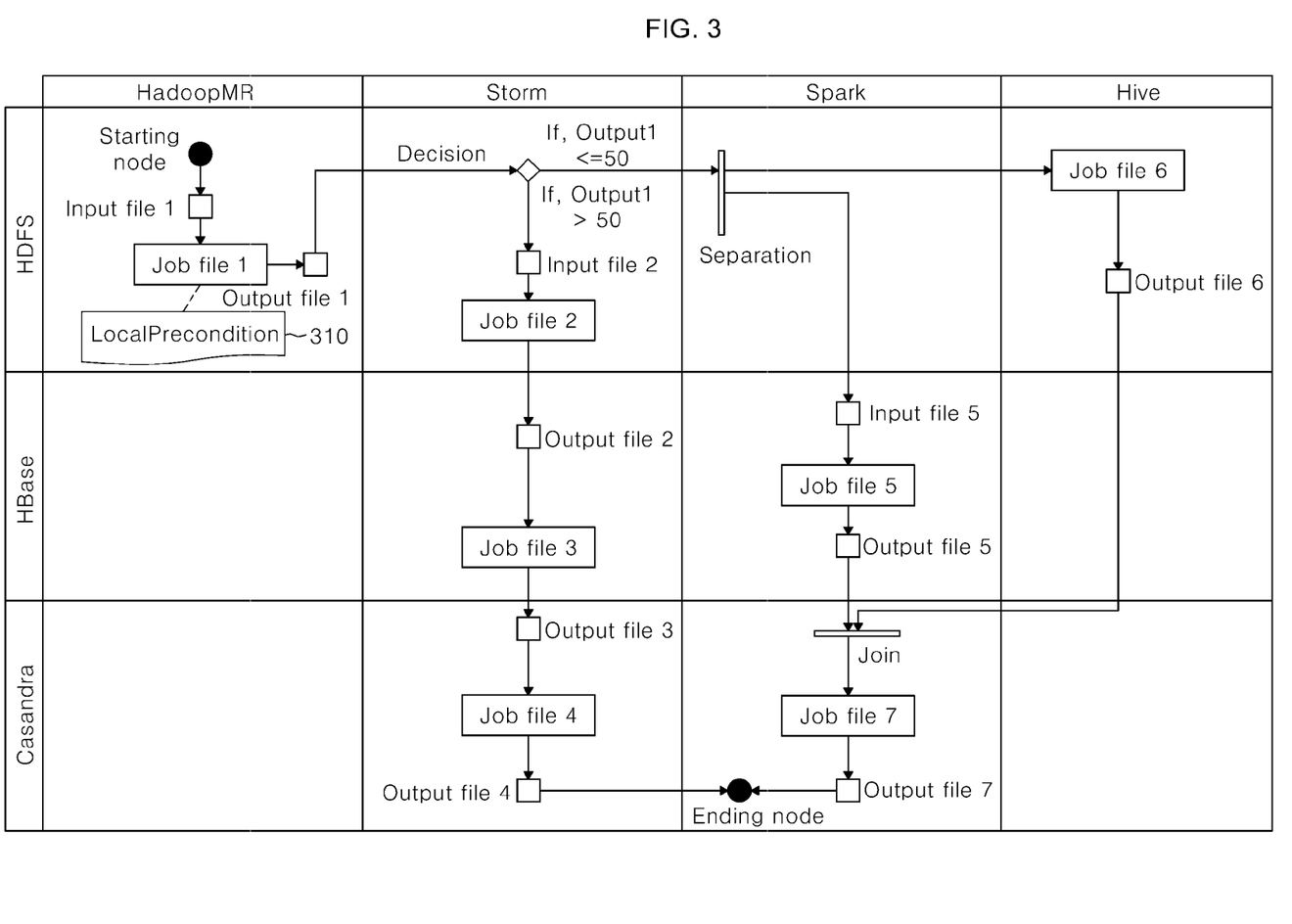
FIG. 3 is an exemplary diagram showing a workflow model generated according to an embodiment of the present invention.

FIG. 2 is an exemplary diagram illustrating a method of generating a workflow model according to an embodiment of the present invention, and FIG. 3 is an exemplary diagram showing a workflow model generated according to an embodiment of the present invention. Depending on the embodiment, at least one of the steps shown in FIG. 2 may be omitted.

In S201, a developer may upload files needed to model a workflow to a cluster. The files uploaded to the cluster may include, for example, a job file, an input file, and an output file.

In S203, a workflow GUI designer may generate a workflow modeling table when a request to perform workflow modeling using the UML is received. The table may include at least one vertical partition and at least one horizontal partition. The number of vertical partitions or horizontal partitions may change depending on the number of values.

In S205, the workflow GUI designer may receive vertical partition and horizontal partition values. For example, the name of the data processing engine may be received as the vertical partition value, and the name of the data storage engine may be received as the horizontal partition value. FIG. 3 shows an example in which HadoopMR, Storm, Spark, and Hive are received as the name of the data processing engine, and HDFS, HBase, and Cassandra are received as the name of the data storage engine.

In S207, the workflow GUI designer may receive starting and end nodes of the workflow. For example, FIG. 3 shows an example in which the starting node is input to a cell included in a data processing engine partition, which is called HadoopMR, and a data storage engine partition, which is called HDFS, and the ending node is input to a cell included in a data processing engine partition, which is called Spark, and a data storage engine partition, which is called Cassandra.

In S209, the workflow GUI designer may receive an action node for specifying a job included in the workflow. Receiving the action node may refer to receiving, for example, the name of a job file, the name of an input file, and the name of an output file.

Figure 4:
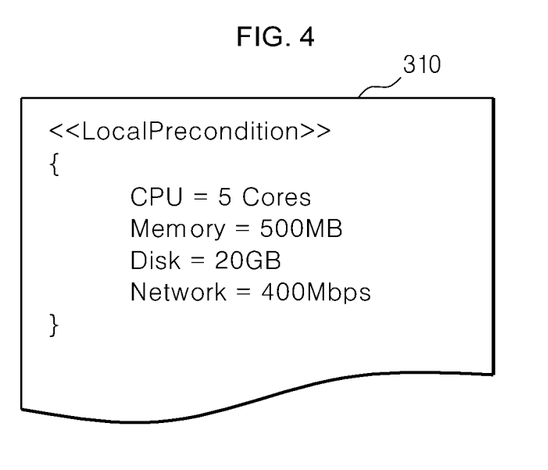
FIG. 4 is an exemplary diagram illustrating resource information attached to a job file according to an embodiment of the present invention.

In S211, the workflow GUI designer may receive resource information needed to execute the jobs. As shown in FIG. 3, the resource information may be attached to the action node (e.g., job file) in the form of annotations. For convenience of description, an example in which resource information 310 is attached to job file 1 is shown in FIG. 3. However, the resource information may be attached to another job file. The resource information may be information associated with, for example, a processor, a memory, a storage space, and a network. FIG. 4 shows an example of the resource information. Referring to FIG. 4, it can be seen that a central processing unit (CPU) having five cores, a memory of 500 MB, a storage space of 20 GB, and a data transmission rate of 400 Mbps is needed to execute job file 1.

In S213, the workflow GUI designer may receive a control flow node. The control flow node may include at least one of a decision node, a join node, and a separation node. The decision node may be a node for separating a flow according to a certain condition. The join node may be a node for joining multiple flows. The separation node may be a node for separating one flow without any conditions. Condition content used to separate the flow may also be received upon reception of the decision node.

In S215, the workflow GUI designer may receive an execution order of the node. For example, FIG. 3 shows an example in which a flow configured in the order of "job file 1—job file 2—job file 3—job file 4" and a flow configured in the order of "job file 1—job file 5 or 6—job file 7" are generated.

In S217, the work flow GUI designer may generate a workflow model conforms to an Object Management Group (OMG) XML Metadata Interchange (XMI) file format on the basis of information input in previous steps and may transmit the generated workflow model to the workflow engine. The generated workflow model may be in the form of an XML file. The XML file may include information about data processing engines and data storage engines needed for jobs included in the workflow model.

Figure 5:
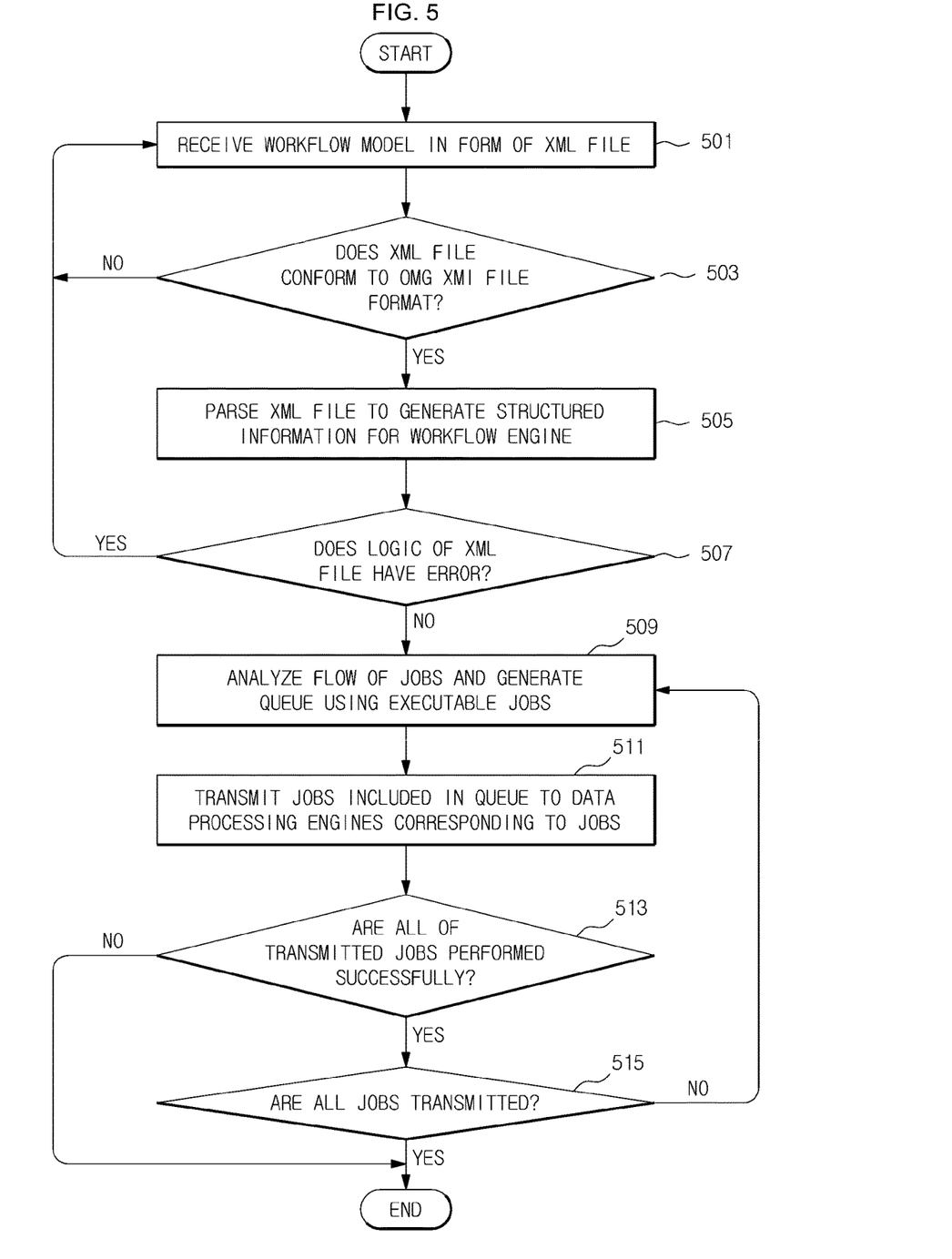
FIG. 5 is a flowchart illustrating a method of executing a workflow model according to an embodiment of the present invention.

FIG. 5 is a flowchart illustrating a method of executing a workflow model according to an embodiment of the present invention. Depending on the embodiment, at least one of steps shown in FIG. 5 may be omitted.

In S501, a workflow engine may receive a workflow model (hereinafter, referred to as an XML file) in the form of an XML file from a developer or a workflow GUI designer.

In S503, the workflow engine may check whether the received XML file conforms to an XML Metadata Interchange (XMI) format, which is an Object Management Group (OMG) standard for the UML. Checking of whether the XML file conforms to the XML Metadata Interchange (XMI) format may refer to checking whether the various tags, attribute values, and characters included in the XML file are inserted at appropriate positions and in appropriate forms.

When it is determined that the received XML file does not conform to the OMG XMI format for the UML, the workflow engine may discard the received XML file and notify the developer of a fact of the discard. Thus, the developer may modify the workflow model or produce a new workflow model.

When the workflow engine determines that the received XML file conforms to the OMG XMI format for the UML, the processing proceeds to S505.

Figure 6:
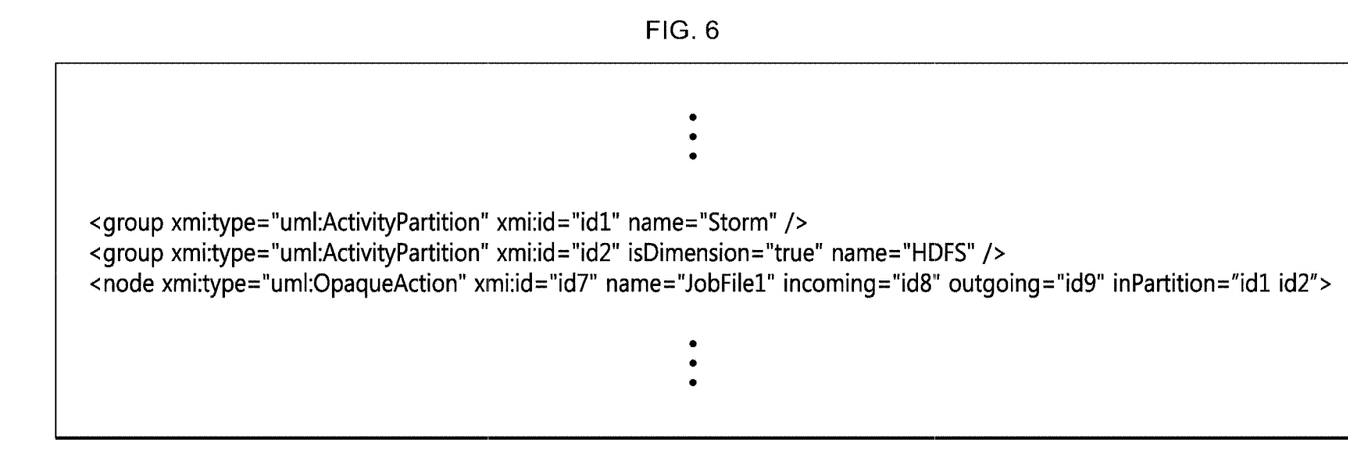
FIG. 6 is an exemplary diagram showing an XML file according to an embodiment of the present invention.
Figure 7:
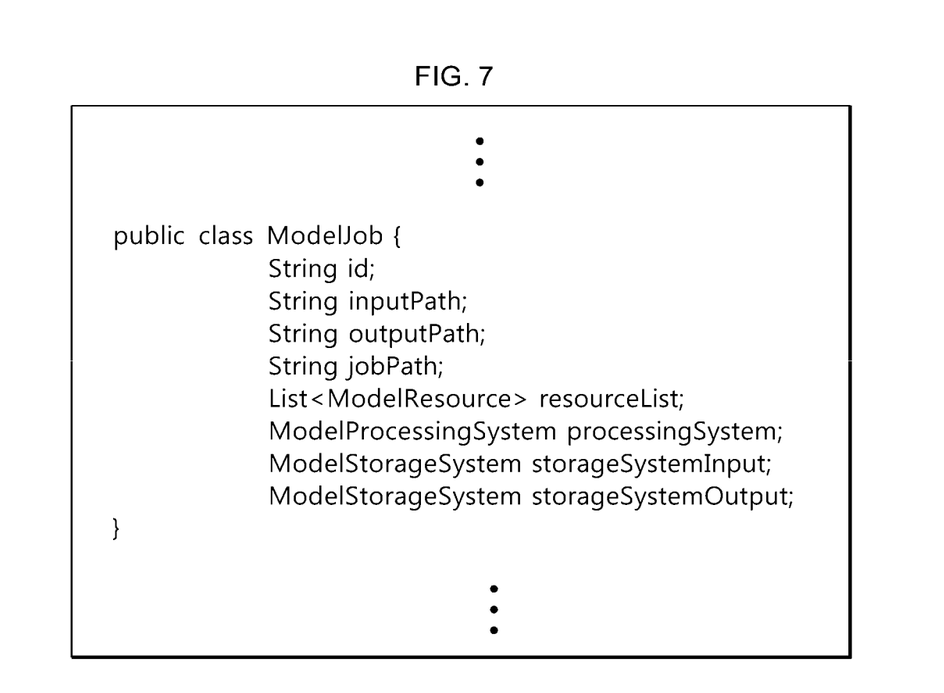
FIG. 7 is an exemplary diagram showing structured information according to an embodiment of the present invention.

In S505, the workflow engine may parse the XML file to generate structured information for the workflow engine. This may refer to converting content included in the XML file into a form processable by the workflow engine. For example, assuming that the XML file as shown in FIG. 6 has been received, the workflow engine may parse the XML file to generate the structured information as shown in FIG. 7.

In S507, the workflow engine may check whether there is an error in logic of the XML file on the basis of the structured information. For example, the workflow engine may check whether the names of the data processing engine and the data storage engine included in the structured information is in an engine name list stored in a metadata database and may determine that there is an error in the logic of the XML file when the names are not in the engine name list. For example, the workflow engine may check whether a resource needed to execute each job exceeds a resource threshold value for a job and may determine that there is an error in the logic of the XML file when the resource exceeds the resource threshold value. For example, the workflow engine may check whether a resource needed to execute a series of jobs (e.g., a flow of "job file 1—job file 2—job file 3—job file 4" or a flow of "job file 1—job file 5 or 6—job file 7") exceeds a resource threshold value for one developer and may determine that there is an error in the logic of the XML file when the resource exceeds the resource threshold value. The resource threshold value may be stored in the metadata database. Information stored in the metadata database may be automatically generated or updated when various types of files are uploaded to or deleted from a cluster. For example, when a certain file is uploaded or deleted, information such as an owner and a size of the file may be stored in or deleted from the metadata database. Information stored in the metadata database may be updated by a system administrator. For example, information such as the name of an available data processing engine, the name of an available data storage engine, a resource threshold value for a job, and a resource threshold value for a user may be updated by the system administrator.

The workflow engine may check whether all job files, input files, and output files included in the parsed structured information are included in the cluster and may determine that there is an error in logic of the XML file when even any one of the files is not included in the cluster.

When it is determined that there is an error in the logic of the XML file, the workflow engine may notify the developer of a result of the determination. Thus, the developer may modify the workflow model or produce a new workflow model.

When it is determined that there is no error in the logic of the XML file, the processing proceeds to S509.

In S509, the workflow engine may analyze a flow of jobs included in the workflow and may use a series of executable jobs to generate a queue. Some of jobs included in the workflow can be executed after other jobs are executed. Accordingly, the workflow engine may use jobs executable in the current state to generate the queue.

In S511, the workflow engine may transmit jobs included in the queue to data processing engines corresponding to the jobs. The structured information generated in S505 may be used to transmit a job to the data processing engines corresponding to the job. The structured information may include information about a data processing engine and a data storage engine that are needed for each job. Accordingly, the workflow engine may transmit the jobs included in the queue to data processing engines corresponding to the jobs with reference to the structured information. Thus, the data processing engine may use the data storage engines corresponding to the jobs to perform the jobs. The workflow engine may monitor whether the transmitted jobs are successfully performed.

In S513, when the workflow engine determines that all of the transmitted jobs are successfully performed, the processing proceeds to S515; otherwise, the processing ends.

In S515, the workflow engine checks whether there are jobs that have not been transmitted to the data processing engines, and the processing proceeds to S509 when there are the jobs. A process from S509 to S515 will be described below as an example. For example, the workflow engine may use job files included in a flow (job file 1—job file 2—job file 3—job file 4) shown in FIG. 3 to generate a queue Q1 and may transmit job files include in the generated queue Q1 to data processing engines corresponding to the jobs. When all of the transmitted job files are successfully performed, the workflow engine may use job files included in the remaining flow (job file 1—job file 5 or 6—job file 7) to generate a queue Q2 and may transmit job files included in the generated queue Q2 to the data processing engines corresponding to the jobs. The workflow engine may monitor whether the transmitted jobs are successfully performed.

Figure 8:
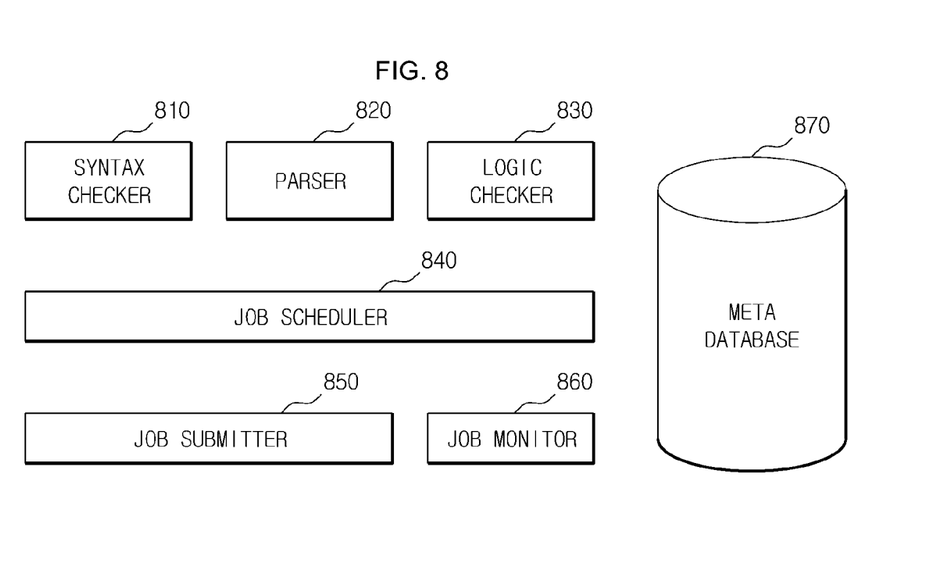
FIG. 8 is a block diagram illustrating a workflow engine according to an embodiment of the present invention.

FIG. 8 is a block diagram illustrating a workflow engine according to an embodiment of the present invention.

A workflow engine according to an embodiment of the present invention includes a syntax checker 810, a parser 820, a logic checker 830, a job scheduler 840, a job submitter 850, and a job monitor 860. Depending on the embodiment, at least some of the above-described elements will be omitted.

The syntax checker 810, the parser 820, and the logic checker 830 may verify the validity of a workflow model received in the form of an XML file.

The syntax checker 810 may analyze an XML file received from a developer (or a UML tool) to check whether the received XML file conforms to the OMG XMI format for the UML. When the received XML file does not conform to the OMG XMI format for the UML, the syntax checker 810 may notify the developer (or the UML tool) of a result of the check. When the received XML file conforms to the OMG XMI format for the UML, the syntax checker 810 may transmit the received XML file to the parser 820.

The parser 820 may parse the XML file received from the syntax checker 810 to generate the structured information for the workflow engine and may transmit the generated structured information to the logic checker 830.

The logic checker 830 may inspect structured information received from the parser 820 to check whether there is an error in logic of the XML file. Information stored in a metadata database 870 or file names included in the cluster may be utilized to check whether there is an error in the logic of the XML file. When it is determined that there is an error in the logic of the XML file, the logic checker 830 may notify the developer of a result of the determination. When it is determined that there is no error in the logic of the XML file, the logic checker 830 may transmit the structured information to the job scheduler 840.

The job scheduler 840, the job submitter 850, and the job monitor 860 may secure that a workflow designed by a developer may run on the data processing engine and the data storage engine appropriately.

The job scheduler 840 may analyze the flow of the jobs included in the workflow on the basis of the structured information received from the logic checker 830. The job scheduler 840 may generate a queue using executable jobs.

The job submitter 850 may transmit jobs included in the queue to the data processing engines corresponding to the jobs. The structured information generated by the parser 820 may be used to transmit the jobs to the data processing engines corresponding to the jobs.

The job monitor 860 may monitor whether the jobs transmitted by the job submitter 850 are performed successfully. When all of the transmitted jobs are performed successfully, the job monitor 860 may notify the job scheduler 840 of a result of the determination. Accordingly, the job scheduler 840 may update the queue using executable jobs. The job submitter 850 may transmit jobs included in the updated queue to the data processing engines corresponding to the jobs.

The metadata database 870 may store a list in which the names of available data processing engines and data storage engines are arranged. In addition, the metadata database 870 may store information about a resource threshold value allocable to a job and a resource threshold value allocable to a developer.

Figure 9:
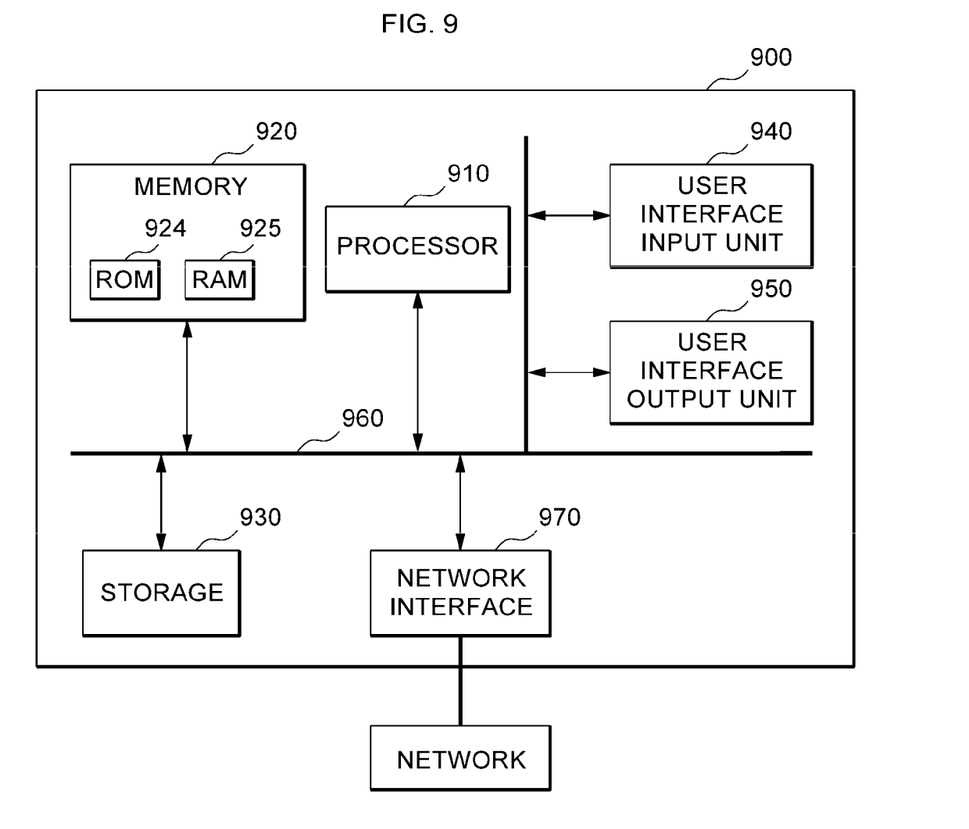
FIG. 9 is a block diagram illustrating an apparatus for generating and executing a workflow model according to an embodiment of the present invention.

Embodiments of the present invention may be implemented as, for example, a computer-readable recording medium in a computer system. As shown in FIG. 9, the computer system 900 may include at least one element among at least one processor 910, a memory 920, a storage unit 930, a user interface input unit 940, and a user interface output unit 950, which may communicate with each other through a bus 960. In addition, the computer system 900 may also include a network interface for accessing a network. The processor 910 may be a central processing unit (CPU) or semiconductor device that executes processing instructions stored in the memory 920 and/or the storage unit 930. The memory 920 and the storage unit 930 may include various types of volatile and/or nonvolatile memory media. For example, the memory 920 may include a read-only memory (ROM) 924 and a random access memory (RAM) 925.

Thus, embodiments of the present invention may be implemented as a nonvolatile computer recording medium in which a computer-implementable method or computer executable instructions are stored. When executed by a processor, the instructions may perform the method according to embodiments of the present invention.

According to embodiments of the present invention, problems due to heterogeneity between workflows caused by various workflow modeling systems can be mitigated.

Embodiments of the present invention can allow developers to easily acquire a workflow runnable on various data storage engines and various data processing engines.

In addition, embodiments of the present invention can provide various types of big data services to various user classes having different knowledge and skills.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of executing a workflow model, the method comprising:
   generating a table including two partitions when a request to perform workflow modeling using Unified Modeling Language (UML) is received;
   receiving a data processing engine name as a value of one of the partitions and receiving a data storage engine name as a value of the other of the partitions;
   receiving at least one of a starting node, an ending node, an action node, and a control flow node of the workflow;
   receiving resource information needed to execute jobs included in the workflow and an execution order of the jobs;
   generating a workflow model conforming to an Object Management Group (OMG) XML Metadata Interchange (XMI) file format based on the input information;
   receiving the generated workflow model needing at least one data storage engine and at least one data processing engine, the workflow model including the jobs;
   parsing the received workflow model to generate structured information including information about a data processing engine and a data storage engine that are needed for each of the jobs;
   verifying validity of the workflow model using the structured information; and transmitting the jobs included in the workflow model to data processing engines corresponding to the jobs when it is determined that the workflow model is valid.

2. The method of claim 1, wherein the workflow model is received in the form of an XML file.

3. The method of claim 2, further comprising:
checking whether the workflow model conforms to the OMG XMI file format; and
discarding the XML file when the XML file does not conform to the OMG XMI file format.

4. The method of claim 1, wherein the verifying of the validity of the workflow model comprises comparing the data processing engine name, the data storage engine name, and a resource allocation amount included in the generated structured information with predetermined information to check whether there is an error in logic of the workflow model.

5. The method of claim 1, wherein the transmitting of the jobs to the data processing engines corresponding to the jobs comprises:
analyzing a flow of the jobs included in the workflow model and generating a queue using executable jobs; and
transmitting the jobs included in the queue to the data processing engines corresponding to the jobs.

6. The method of claim 5, further comprising updating the queue using executable jobs among jobs remaining in the workflow model when the transmitted jobs are performed successfully.

7. An apparatus for executing a workflow model, the apparatus comprising:
a processor for executing a workflow engine, the workflow engine implemented in instructions executed by the processor and comprising:
a workflow model generator for:
generating a table including two partitions when a request to perform workflow modeling using Unified Modeling Language (UML) is received;
receiving a data processing engine name as a value of one of the partitions and receiving a data storage engine name as a value of the other of the partitions;
receiving at least one of a starting node, an ending node, an action node, and a control flow node of the workflow;
receiving resource information needed to execute jobs included in the workflow and an execution order of the jobs;
generating a workflow model conforming to an Object Management Group (OMG) XML Metadata Interchange (XMI) file format based on the input information;
a syntax checker configured to receive the generated workflow model needing at least one data storage engine and at least one data processing engine and check whether the received workflow model conforms to the OMG XMI file format, the workflow model including the jobs;
a parser configured to parse the workflow model to generate structured information including information about a data processing engine and a data storage engine that are needed for each of the jobs when the workflow model conforms to the OMG XMI file format;
a logic checker configured to verify validity of the workflow model using the structured information; and
a job submitter configured to transmit the jobs included in the workflow model to data processing engines corresponding to the jobs when the workflow model is valid.

8. The apparatus of claim 7, wherein the workflow model is received in the form of an XML file.

9. The apparatus of claim 7, wherein the syntax checker discards the workflow model when the workflow model does not conform to the OMG XMI file format.

10. The apparatus of claim 7, wherein the logic checker compares the data processing engine name, the data storage engine name, and a resource allocation amount included in the generated structured information with predetermined information to check whether there is an error in logic of the workflow model.

11. The apparatus of claim 7, further comprising a job scheduler configured to analyze a flow of the jobs included in the workflow model and generate a queue using executable jobs,
wherein the job submitter transmits the jobs included in the queue to the data processing engines corresponding to the jobs.

12. The apparatus of claim 11, further comprising a job monitor configured to monitor whether the transmitted jobs are performed successfully,
wherein when the transmitted jobs are performed successfully, the job scheduler updates the queue using executable jobs among jobs remaining in the workflow model.

* * * * *